United States Patent Office 3,793,326
Patented Feb. 19, 1974

3,793,326
3,4-DIHYDRO - 6,7 - SUBSTITUTED - 2,2,3-LOWER ALKYL - 4-OXO-(2H)-QUINAZOLECARBOXYLIC ACID DERIVATIVES USEFUL AS ANALGESIC AND TRANQUILIZER AGENTS
James F. Muren, Norwalk, Conn., assignor to Pfizer Inc., New York, N.Y.
No Drawing. Continuation-in-part of abandoned application Ser. No. 26,406, Apr. 7, 1970. This application Jan. 3, 1972, Ser. No. 215,117
Int. Cl. C07d 51/48
U.S. Cl. 260—251 QA                  10 Claims

ABSTRACT OF THE DISCLOSURE 6,7-disubstituted-quinazolinones useful as analgesic and tranquilizer agents having the formula:

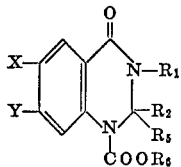

wherein X and Y are each selected from the group consisting of H, halogen, R, and OR; and R, $R_1$, $R_2$ and $R_5$ are hydrogen or lower alkyl and $R_6$ is lower alkyl. Preferred compounds are 3,4-dihydro-6,7-dimethoxy-2,3-dimethyl, 3-ethyl-2-methyl, 2-methyl-3-propyl, 2,2,3-trimethyl, and 3-methyl-4-oxo-1(2H)-quinazoline-carboxylic acid, ethyl esters; and 3,4-dihydro-6-ethoxy-7-methoxy-2,3-dimethyl, 3,4-dihydro-6-methoxy-7-ethoxy-2-methyl-3-ethyl, and 3,4 - dihydro-6-methoxy-7-isopropoxy-2,3-dimethyl-4-oxo-1(2H)-quinazoline, carboxylic acid, ethyl ester.

CROSS REFERENCE TO RELATED APPLICATIONS

This application is a continuation-in-part of U.S. Ser. No. 26,406, filed on Apr. 7, 1970 and now abandoned.

BACKGROUND OF THE INVENTION

This invention relates to novel 6,7-substituted quinazolinones which have useful therapeutic properties in the field of medicinal chemistry.

More particularly, the compounds of the invention are useful as analgesic and tranquilizer agents.

SUMMARY OF THE INVENTION

The compounds of the invention are those having the general formula:

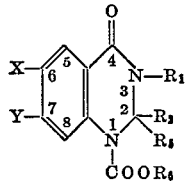

where X and Y are each selected from the group consisting of H, halogen, —R and —OR; R, $R_1$, $R_2$ and $R_5$ are each selected from the group consisting of hydrogen and lower alkyl, said lower alkyl having from 1 to 4 carbon atoms; and $R_6$ is lower alkyl, said lower alkyl having from 1 to 4 carbon atoms.

The novel compounds of the invention are useful as analgesic and tranquilizer agents in mammals. Specifically effective compounds exhibiting both tranquilizer and analgesic activity are 3,4-dihydro-6,7-dimethoxy-2,3-dimethyl-4-oxo-1(2H)-quinazoline-carboxylic acid, ethyl ester;
3,4-dihydro-6,7-dimethoxy-3-ethyl-2-methyl-4-oxo-1(2H)-quinazoline-carboxylic acid, ethyl ester;
3,4-dihydro-6,7-dimethoxy-2-methyl-3-propyl-4-oxo-1(2H)-quinazoline-carboxylic acid, ethyl ester;
3,4-dihydro-6,7-dimethoxy-2,2,3-trimethyl-4-oxo-1(2H)-quinazoline-carboxylic acid, ethyl ester;
3,4-dihydro-2,3-dimethyl-6-ethoxy-7-methoxy-4-oxo-1(2H)-quinazoline-carboxylic acid, ethyl ester;
3,4-dihydro-7-ethoxy-3-ethyl-6-methoxy-2-methyl-4-oxo-1(2H)-quinazolinecarboxylic acid, ethyl ester; and
3,4-dihydro-2,3-dimethyl-7-isopropoxy-6-methoxy-4-oxo-1(2H)-quinazolinecarboxylic acid, ethyl ester.

A particularly effective compound exhibiting tranquilizer activity is 3,4 - dihydro - 6,7 - dimethoxy-3-methyl-4-oxo-1(2H)-quinazoline-carboxylic acid, ethyl ester.

DETAILED DESCRIPTION OF THE INVENTION

Where $R_5$ is H, the compounds of the invention can be prepared by first selectively reducing with a metal hydride a substituted quinazolin-3-one Compound V of the formula:

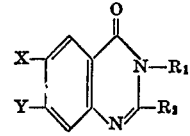

(V)

at a temperature of about 0° C. to yield a compound (Va) of the formula:

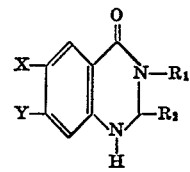

(Va)

Alternatively, the quinazolin-4-one compound can be reduced in the form of the acid addition salt, preferably the hydrochloric acid addition salt. Preferable metal hydrides are $LiBH_4$, and $NaBH_4$.

Then the quinazolin-4-one compound (Va) or its acid addition salt is reacted at a temperature of about 10–25° C. with a compound of the formula ZCl, ZF, ZI or ZBr or is reacted at a temperature of about 10–50° C. with a compound of the formula ZOR and a base to form the desired novel compounds of the invention having the formula:

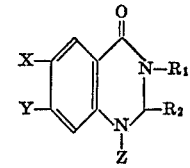

wherein Z can be CN, —C(R)O, —C(O)CF$_3$,

—C(O)N(R)(R'), and —C(O)OR; R and R' can each be typically H or lower alkyl, and R in ZOR can be additionally aryl (e.g. phenyl). The base to be used with ZOR can be typically an alkali metal hydride, hydroxide, and oxide.

Similarly, Compounds Vb of the formula:

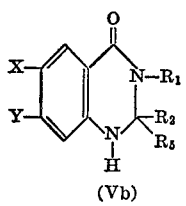

(Vb)

are reacted with ZCl, ZF, ZI, ZBr, or ZOR to form the desired novel compound of the invention having the formula:

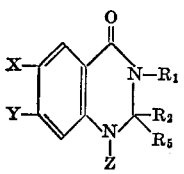

Where $R_5$ is H, the substituted quinazolin-4-one starting compound can be conveniently prepared by first reacting a disubstituted anthranilic ester (I) with an N,N-disubstituted amide (II), in the presence of either $POCl_3$, $SOCl_2$, or $COCl_2$ at a temperature between $-10$ and $30°$ C.

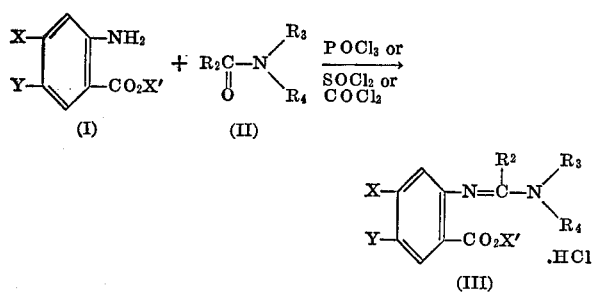

The resulting product (III) is then reacted with a substituted amine (IV) in a reaction inert solvent, such as ethanol or water, at a temperature of about 0 to 100° C. to yield the desired reactant substituted quinazolin-4-one starting Compound V.

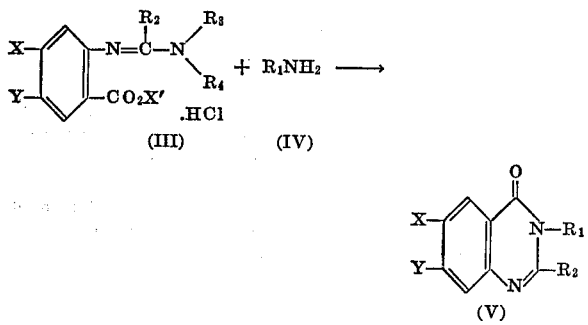

$R_1$ and $R_2$ are as previously defined. X', $R_3$ and $R_4$ can be typically lower alkyl, except X' and $R_4$ are each never H, and $R_3$ can be H.

Also, V may be prepared by reaction of a disubstituted anthranilic acid (VI) and acid anhydride (VII) to form a disubstituted benzoxazinone (VIII).

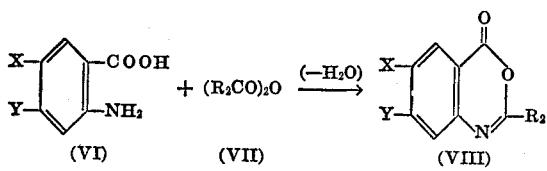

This is reacted with an amine (IX) in an alcoholic solvent (e.g. ethanol) at about 0–100° C. to form intermediate X. The intermediate Compound X may be isolated or cyclized directly to yield V by heating or my treatment with a basic catalyst (e.g. KOH or NaOH) at about 20–100° C.

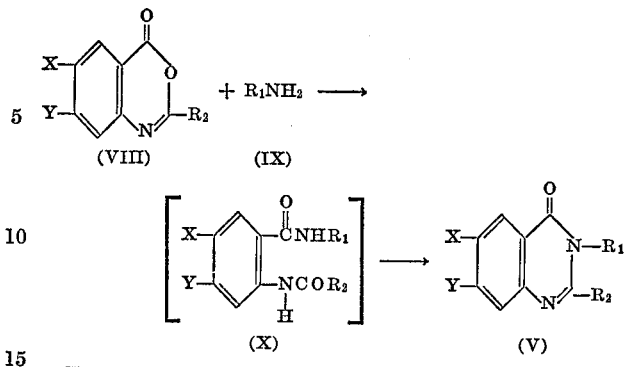

For preparation of Compounds Vb where neither $R_2$ and $R_5$ is H, a disubstituted anthranilamide (XI) is reacted with a ketone (XII) in the presence of an acid catalyst (e.g. HCl, $H_2SO_4$, etc.).

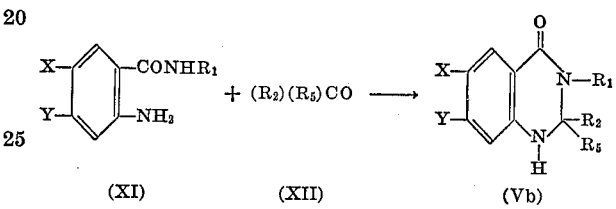

The starting materials necessary for the above reaction methods leading to the desired compounds are either all known compounds or else they can easily be prepared by those skilled in the art in accordance with standard organic procedures.

The novel compounds of the invention exhibit activity as tranquilizer and analgesic agents in mammals. Among these compounds, a preferred class of compounds has been found to be those in which Z represents $—C(O)OR_6$. Specifically effective tranquilizer and analgesic agents being 3,4-dihydro-6,7-dimethoxy-2,3-dimethyl-4-oxo-1(2H)-quinazoline-carboxylic acid, ethyl ester;

3,4-dihydro-6,7-dimethoxy-3-ethyl-2-methyl-4-oxo-1-(2H)-quinazolinecarboxylic acid, ethyl ester;

3,4-dihydro-6,7-dimethoxy-2-methyl-3-propyl-4-oxo-1-(2H)-quinazolinecarboxylic acid, ethyl ester;

3,4-dihydro-6,7-dimethoxy-2,2,3-trimethyl-4-oxo-1(2H)-quinazolinecarboxylic acid, ethyl ester;

3,4-dihydro-2,3-dimethyl-6-ethoxy-7-methoxy-4-oxo-1 (2H)-quinazolinecarboxylic acid, ethyl ester;

3,4-dihydro-7-ethoxy-3-ethyl-6-methoxy-2-methyl-4-oxo-1 (2H)-quinazolinecarboxylic acid, ethyl ester;

3,4-dihydro-2,3-dimethyl-7-isopropoxy-6-methoxy-4-oxo-1 (2H)-quinazolinecarboxylic acid, ethyl ester;

A specifically effective tranquilizer agent is 3,4-dihydro-6,7 - dimethoxy - 3-methyl-4-oxo-1-(2H)-quinazoline-carboxylic acid, ethyl ester.

The compounds of the present invention are conveniently administered in composition form. Such compositions include a pharmaceutical carrier selected on the basis of the chosen route of administration and standard pharmaceutical practice. For example, they may be administered orally in the form of tablets containing such excipients as starch, milk, sugar, certain types of clay, etc. They may be administered in capsules, in admixtures with the same or equivalent excipients. They may also be administered orally in the form of oral suspensions which may contain flavoring and coloring agents. They may be injected parenterally, i.e. for example, intramuscularly or subcutaneously. For oral administration of the therapeutic agents of this invention, tablets or capsules containing from about 25 to about 500 mg. are suitable for most applications.

The physician will determine the dosage which will be most suitable for an individual patient and it will vary with the form of administration, the age, weight and response of the particular patient. Generally, however, the initial dosage in adults may range from 25 to 1000 mg. per day divided into 2 or 4 equal doses. In many instances, it is not necessary to exceed 500 mg. daily.

The following examples are given by way of illustration and are not to be construed as limitations of this invention, many variations of which are possible within the scope and spirit thereof. Temperatures are in degrees C. unless otherwise specified.

EXAMPLE I

Preparation of 6,7-dimethoxy-3-methyl-4(3H)-quinazolinone

To 150 ml. of cold (0° C.) dimethylformamide is added 21.8 g. (0.142 mole) of phosphorous oxychloride dropwise over 5 minutes, followed by dropwise addition of a solution of 30.0 g. (0.142 mole) of methyl 4,5-dimethoxyanthranilate in 150 ml. of dimethylformamide over a 30 minute period. The temperature is maintained below 10° C. The resulting white slurry is allowed to warm to room temperature while stirring, and then chilled to 5° C. and filtered. The solid product is washed with 100 ml. of cold ethanol and finally with 200 ml. of ether and oven dried to give 41.8 g. (98%) of white microcrystalline solid, M.P. 204–204.5°. The analytical sample is prepared by recrystallization of a 2 g. sample from ethanol to give 1.58 g. of material with M.P. 206°.

*Analysis.*—Calcd. for $C_{13}H_{19}ClN_2O_4$ (percent): C, 51.20; H, 6.32; N, 9.22; Cl, 11.70. Found (percent): C, 51.19; H, 6.43; N, 9.11; Cl, 11.69.

To a slurry of 3.0 g. (10 mmoles) of the solid product prepared above in 50 ml. of ethanol is passed a stream of gaseous methylamine for 10 min. There is a partial solution after 5 min. followed by a heavy precipitation. The mixture is chilled to 5° and filtered to give 1.24 g. (56%) of white microcrystalline solid, M.P. 211–212°. An additional 0.76 g. (35%) of material M.P. 210–212° is obtained by concentration of the mother liquor. The combined solid (2.0 g., 91%) are recrystallized from ethyl acetate to provide 1.1 g. of 6,7-dimethoxy-3-methyl-4(3H)-quinazolinone as white needles, M.P. 211–212°.

*Analysis.*—Calcd. for $C_{11}H_{12}N_2O_3$ (percent): C, 59.99; H, 5.49; N, 12.72. Found (percent): C, 59.77; H, 5.61; N, 12.75.

EXAMPLE II

Part A: Preparation of 2,3-dihydro-6,7-dimethoxy-3-methyl-4(1H)-quinazolinone (1)

6,7-dimethoxy-3-methyl-4(3H)-quinazolinone (11.0 g., 50 mmoles), prepared in a similar manner to that described in Example I, is suspended in 100 ml. of tetrahydrofuran (THF), cooled to 0°, and treated with 1.20 g. (55 mmoles) of $LiBH_4$. The suspension is heated at reflux under $H_2$ for 20 hours, cooled, and poured carefully into ice water. After thorough extraction of the mixture with $CH_2Cl_2$, the extract is dried using $MgSO_4$ and evaporated in vacuo to yield a white, crystalline residue, 13.4 g., M.P. 112–115°. One crystallization from ethyl acetate provides 9.23 g. of pure (1): M.P. 115–116.5°; IR (KBr) 3.01 (NH), 6.10μ (C=O); UV$_{max}$. ($C_2H_5OH$) 233, 267, 307 mμ (log ε 4.4, 3.8, 3.6); NMR ($CDCl_3$) δ 3.0 (s., 3H, $CH_3N$), 3.8 (s., 6H, $CH_3O$), 4.6 (s., 2H, $CH_2$), 4.9 (broad s., 1H, exchanges with $D_2O$, NH), 6.3 (s., 1H, H–8), 7.4 (s., 1H, H–5).

*Analysis.*—Calcd. for $C_{11}H_{14}N_2O_3$ (percent): C, 59.45; H, 6.35; N, 12.60. Found (percent): C, 59.34; H, 6.35; N, 12.51.

Similar results are obtained using $LiAlH_4$ or $NaBH_4$ in place of $LiBH_4$.

Part B: Preparation of 3,4-dihydro-6,7-dimethoxy-3-methyl-4-oxo-1(2H)-quinazolinecarboxylic acid, ethyl ester (2)

A well-stirred suspension of (1) (6.66 g., 30 mmoles) and anhydrous $K_2CO_3$ (20.8 g., 150 mmoles) in 50 ml. of $CH_2Cl_2$ is treated with a solution of ethyl chloroformate (3.80 g., 35 mmoles) in 25 ml. of $CH_2Cl_2$ at such a rate so as to maintain a reaction temperature of 25°. The pale yellow mixture is stirred for 20 hours at room temperature, then worked up by adding water and isolating the product by $CH_2Cl_2$ extraction. Chromatography of the crude residue on silica gel (elution with THF) yields a colorless oil (7.3 g.), which crystallizes from isopropyl alcohol. One recrystallization affords 4.4 g. of pure (2): M.P. 117.5–119°; IR (KBr) 5.80 (carbamate carbonyl), 6.03μ (amide carbonyl); UV$_{max}$. ($C_2H_5OH$) 232, 265, 307 mμ (log ε 4.6, 3.9, 3.7); NMR ($CDCl_3$) δ 1.3 (t., J=7 c.p.s., 3H, C—$CH_3$), (s., 3H, $NCH_3$), 3.9 (s., 3H, $OCH_3$), 4.3 (q., J=7 c.p.s., 2H, $OCH_2$), 5.1 (s., 2H, $NCH_2$), 7.2 (s., 1H, H–8), 7.5 (s., 1H, H–5).

*Analysis.*—Calcd. for $C_{14}H_{18}N_2O_5$ (percent): C, 57.13; H, 6.16; N, 9.52. Found (percent): C, 56.90; H, 6.29; N, 9.47.

For Examples III and IV, 6,7-dimethoxy-2,3-dimethyl-4(3H)-quinazolinone starting material is prepared in a similar manner to the procedure described in Example I using the appropriate stoichiometric amounts of reactants, except that dimethylacetamide is substituted for dimethylformamide.

For Example V, 6,7-dimethoxy-3-ethyl-2-methyl-4(3H)-quinazolinone starting material is prepared similarly according to the procedure described in Example I and using the appropriate stoichiometric amounts of reactants, except that dimethylacetamide and ethylamine are substituted for dimethylformamide and methylamine, respectively.

EXAMPLE III

Part A: Preparation of 2,3-dihydro-6,7-dimethoxy-2,3-dimethyl-4(1H)-quinazolinone (3)

6,7-dimethoxy-2,3-dimethyl-4(3H)-quinazolinone (11.7 g., 50 mmoles) is converted to the hydrochloride salt in ether with dry HCl. The salt is filtered and suspended in 150 ml. of diglyme under $N_2$. After cooling the suspension to 0°, $NaBH_4$ (2.8 g., 75 mmoles) is added in portions and the mixture stirred at room temperature for one hour. Water is added to hydrolyze the excess $NaBH_4$ and the mixture is evaporated to dryness under reduced pressure. The residue is partitioned between $CH_2Cl_2$ and $H_2O$, the $CH_2Cl_2$ layer is dried using $MgSO_4$, and the solvent evaporated. Trituration of the residual yellow oil yields a colorless, crystalline product, 10.9 g., M.P. 92–95°. Recrystallization from benzene provides (3), which contains a fraction of a mole of benzene: M.P. 95–97°; IR (KBr) 2.95, 3.10 (NH), 6.14μ (C=O); NMR ($CHCl_3$) δ 1.4 (d., J=6, 3H, C—$CH_3$), 3.0 (s., 3H, $NCH_3$), 3.8 (two s., 6H, $OCH_3$), 4.8 (q., J=6, 1H CH), 5.0 (broad s., 1H, exchanges with $D_2O$, NH), 6.2 (s., 1H, H–8), 7.35 (s., 2H, solvent), 7.4 (s., 1H, H–5).

*Analysis.*—Calcd. for $C_{12}H_{16}N_2O_3 \cdot \frac{1}{3}C_6H_6$ (percent): C, 64.10; H, 6.92; N, 10.68. Found (percent): C, 63.52; H, 6.89; N, 10.95.

Part B: Preparation of 3,4-dihydro-6,7-dimethoxy-2,3-dimethyl - 4 - oxo - 1(2H)-quinazolinecarboxylic acid, ethyl ester (4)

A solution of (3) (5.75 g., 25 mmoles) in 50 ml. of $CH_2Cl_2$ was cooled to 0°. Anhydrous $K_2CO_3$ (17.4 g., 125 mmoles) is added, followed by careful addition of ethyl chloroformate (2.98 g., 28 mmoles) in 25 ml. of $CH_2Cl_2$. Reaction temperature is maintained below 10° during the addition, then the mixture is stirred at room temperature for 20 hours. Water is added and the organic phase is washed with $H_2O$, 1 N aqueous HCl, and $H_2O$. Evaporation of the solvent yielded a yellow oil which is chromatographed on silica gel (elution with ethyl acetate). The final two fractions afford a colorless oil, which is crystallized from a mixture of Et$_2$O-pet. ether to provide (4): M.P. 70–74°; IR (KBr) 5.79 (carbamate C=O), 6.04μ (amide C=O); NMR (CDCl$_3$) δ 1.3 (t., J=7, 3H, ester CH$_3$), 1.3 (d., J=7, 3H, 2-CH$_3$), 3.1 (s., 3H, N—CH$_3$), 3.9 (s., 6H, OCH$_3$), 4.3 (q., J=7, 2H, ester CH$_2$), 5.9 (q., J=7, 1H, H–2), 7.2 (s., 1H, H–8), 7.5 (s., 1H, H–5).

*Analysis.*—Calcd. for C$_{15}$H$_{20}$N$_2$O$_5$ (percent): C, 58.44; H, 6.54; N, 9.09. Found (percent): C, 58.10; H, 6.76; N, 9.10.

EXAMPLE IV

Part A: The preparation of 2,3-dihydro-6,7-dimethoxy-2,3-dimethyl-4(1H)-quinazolinone (3)

A 22 l. round-bottomed flask is charged with 4.4 l. of dry tetrahydrofuran, 252.0 g. (6.67 moles) of sodium borohydride and 627.0 g. (2.68 moles) of 6,7-dimethoxy-2,3-dimethyl-4(3H)-quinazolinone. The slurry is vigorously stirred at 0° C. as a solution of 226.0 g. (3.74 moles) of glacial acetic acid in 2.5 l. of tetrahydrofuran is slowly added over a 2 hour period. The cooling bath is removed and the reaction mixture is allowed to warm to room temperature over a 16 hour period.

The reaction mixture is added portionwise to 16 l. of ice and water with stirring. Chloroform (16 l.) then is added to the stirred mixture and the layers separated. The aqueous phase is extracted a second time with a 10 l. portion of chloroform and the extracts are combined. The chloroform solution is dried over anhydrous sodium sulfate and then concentrated in vacuo to a volume of ca. 1.5 l. Benzene (6 l.) is added and the mixture reconcentrated to a volume of ca. 2 l. With stirring and at room temperature, 6.0 l. of diethyl ether is slowly added as the product crystallizes. The resulting slurry is filtered, washed with ether and dried in the atmosphere to give 630.0 g. (100% of theory) of product (3); M. P., 93.0–100.0° C.

Part B: Preparation of 3,4-dihydro-6,7-dimethoxy-2,3-dimethyl-4-oxo - 1(2H) - quinazolinecarboxylic acid, ethyl ester (4)

A 12 l. round-bottomed flask is charged with 3.0 l. of dry diethyl carbonate, 155.0 g. of a 60.2% sodium hydride in oil suspension (93.3 g. or 3.88 moles of NaH) and 600.0 g. (2.54 moles) of 2,3-dihydro-6,7-dimethoxy- 2,3-dimethyl-4(1H)-quinazolinone (3). The slurry is stirred at room temperature under an atmosphere of dry nitrogen as 6.0 ml. of ethanol is added. After stirring about one hour a vigorous reaction commences. Hydrogen gas is evolved and the temperature rises to a maximum of 45° C. over a 5 minute period. The reaction mixture is stirred an additional hour at the ambient temperature and then carefully poured into 6 l. of an ice and water mixture under an atmosphere of nitrogen. The aqueous mixture is extracted twice with 4 l. portions of chloroform. The chloroform extracts are combined, backwashed 2.0 l. of 1 N HCl solution and then with 1.0 l. of saturated aqueous sodium chloride solution. The chloroform layer is concentrated in vacuo to an oil and the concentrate stirred with 4 l. of hexane giving a crystalline slurry. The slurry is cooled to 0° C. and filtered. Air drying gives 698.0 g. of crude product.

The crude product is taken up in 14 l. of isopropyl ether at about 50° C., treated with Darco G–60, filtered and the solution then concentrated in vacuo to a volume of about 4 liters. The resulting slurry is cooled to 20° C. and filtered. The cake is washed with the cold isopropyl ether and dried in the atmosphere to give 597.0 g. (76.5% of theory) of pure material (4); M.P., 100.0–101.0° C.

EXAMPLE V

Part A: Preparation of 2,3-dihydro-6,7-dimethoxy-3-ethyl-2-methyl-4(1H)-quinazolinone (5)

A susupension of 6,7-dimethoxy-3-ethyl-2-methyl-4 (3H)-quinazolinone (9 g., 36 mmoles) and 3.82 g. (72 mmoles) of sodium borohydride in 90 ml. of dry tetrahydrofuran (THF) was stirred and cooled at approximately 0° while 3.22 g. (54 mmoles) of acetic acid in 25 ml. of THF was added over 30 min. The yellow suspension was stirred 0.5 hour at 0°, and allowed to warm to room temperature, then poured onto 300 ml. of water and extracted with CH$_2$Cl$_2$ (3× 300 ml.). The combined CH$_2$Cl$_2$ extracts were dried over Na$_2$SO$_4$ and evaporated in vacuo to give a cloudy oil which crystallized upon standing. Recrystallization from benzene/hexane gave 7.55 g. (83%) of a white solid, M.P. 118–121°; IR (KBr) 3.0 (NH), 6.1μ (C=O); NMR (CDl$_3$): δ 1.22 (t., J=7 c.p.s., 3H, CH$_2$CH$_3$), 1.42 (d., J=6) c.p.s., 3H, CHCH$_3$), 3.15 (p., J=7 c.p.s., 1H, NCH$_2$CH$_9$), 3.79 (s., 3H, OCH$_3$), 3.80 (s., 3H, OCH$_3$), 3.90 (p., J=7 c.p.s., 1H, NCH$_2$CH$_3$), 4.32 (broad s., 1H, NH), 4.83 (q., J=6 c.p.s., 1H, C–2H), 6.20 (s., 1H, C–8H), and 7.40 (s., 1H, C–5H).

*Analysis.*—Calcd. for C$_{13}$H$_{18}$O$_3$N$_2$ (percent): C, 62.38; H, 7.25; N, 11.19. Found (percent): C, 62.47; H, 7.55; N, 11.17.

Part B: Preparation of 3,4-dihydro-6,7-dimethoxy-3-ethyl-2-methyl-4-oxo-1(2H)-quinazolinecarboxylic acid, ethyl ester (6)

A suspension of 4.9 g. (20 mmoles) of 2,3-dihydro-6,7-dimethoxy-3-ethyl-2-methyl-4(1H)-quinazolinone (5) and 1.48 g. (equivalent to 30 mmoles) of sodium hydride (49% dispersion in mineral oil) in 60 ml. of dry diethyl carbonate was stirred for 3 hours at room temperature. The tan suspension was poured onto ice water and extracted with chloroform. The combined chloroform extracts were dried over magnesium sulfate and concentrated in vacuo to give an orange oil which was chromatographed on silica gel. The least polar fraction was collected and crystallized upon standing. Recrystallization from cyclohexane gave 3.9 g. (62%) of product (6), M.P. 80–85°, IR (KBr) 5.80 (ester C=O) and 6.02μ (C=O); NMR (CDCl$_3$): 1.1–1.5 (m., 9H, CHCH$_3$): δ 1.1–1.5 (m., 9H, CHCH$_3$, NCH$_2$CH$_3$, CO$_2$CH$_2$CH$_3$), 3.17 (p., J=7 c.p.s., 1H, NCH$_2$CH$_3$), 3.93 (s., 3H, OCH$_3$), 3.8–4.2 (p., J=7 c.p.s., 1H, OCH$_2$), 5.92 (q., J=6 c.p.s., 1H, CHCH$_3$), 7.15 (s., 1H, C–8H), and 7.50 (s., 1H, C–5H).

*Analysis.*—Calcd. for C$_{16}$H$_{22}$N$_2$O$_5$ (percent): C, 59.61; H, 6.88; N, 8.69. Found (percent): C, 59.59; H, 6.86; N, 8.61.

EXAMPLE VI

Part A: Preparation of 6,7-dimethoxy-2-methyl-3-propyl-4(3H)-quinazolinone (7)

A solution of 50 g. (236 mmoles) of methyl, 4,5-dimethoxy-anthranilate in 200 ml. of dimethylacetamide was cooled at 0–10° while 74 g. (480 mmoles) of phosphorus oxychloride was added dropwise over approximately 2 hrs. The reaction mixture was stirred for 2 hrs. at 0–5°, then treated with 500 ml. of 40% propylamine solution while the temperature was maintained at 60°. The reaction mixture was cooled and filtered to afford a solid which was crystallized from ethanol/water to give (7) as white needles, M.P. 118–20°. Total yield: 45 g. (72%).

*Analysis.*—Calcd. for C$_{14}$H$_{18}$O$_3$N$_2$ (percent): C, 64.10; H, 6.92; N, 10.68. Found (percent): C, 64.16; H, 6.98; N, 10.76.

Part B: Preparation of 2,3-dihydro-6,7-dimethoxy-3-propyl-2-methyl-4-(1H)-quinazolinone (8)

The method described in Example V, part A, was employed. From the reaction of 5.25 g. (20 mmoles) of (7), 1.89 g. (50 mmoles) of sodium borohydride, and 1.8 g. (30 mmoles) of acetic acid in 50 ml. of dry tetrahydrofuran there was obtained an oil which was chromatographed on silica gel, eluting with ethyl acetate. After recrystallization from benzene/hexane, there was obtained 2.5 g. (47% yield) of crystalline product (8), M.P. 78–82°.

*Analysis.*—Calcd. for C$_{14}$H$_{20}$O$_3$N$_2$ (percent): C, 63.61; H, 7.63; N, 10.60. Found (percent): C, 63.32; H, 7.57; N, 10.38.

Part C: Preparation of 3,4-dihydro-6,7-dimethoxy-2-methyl-3-propyl - 4 - oxo-1(2H)-quinazolinecarboxylic acid, ethyl ester (9)

The method described in Example V, part B, was employed. From the reaction of 10.5 g. (40 mmoles) of viscous oil (8), 1.42 g. (59 mmoles; 2.9 g. 49% mineral oil dispersion), and 120 ml. of dry diethyl carbonate there was obtained a brown oil which was chromatographed on silica gel with 3:1 ethyl acetate:hexane to give a light brown oil which was then evaporatively distilled at 190° (0.04 mm.) to give 3.5 g. (26%) of (9) as a light orange oil.

*Analysis.*—Calcd. for $C_{17}H_{24}O_5N_2$ (percent): C, 60.70; H, 7.19; N, 8.33. Found (percent): C, 60.45; H, 7.31; N, 8.31.

EXAMPLE VII

Part A: Preparation of 2,3-dimethyl-7-methoxy-4(3H)-quinazolinone (10)

A solution of 16 g. (88 mmoles) of methyl 4-methoxyanthranilate in 75 ml. of dimethylacetamide was stirred at 0–10° while 27 g. (176 mmoles) of ethyl chloroformate was added dropwise over approximately 1 hr. The resulting slurry was stirred 2 hrs. at 0–10°, then treated with 210 ml. of 40% methylamine solution while the temperature was maintained at 60°. The reaction mixture was allowed to come to room temperature, then cooled in an ice bath and filtered to give 15.3 g. (85% yield) of (10), M.P. 141–145°. Recrystallization from benzene afforded an analytical sample, M.P. 145–46.5°.

*Analysis.*—Calcd. for $C_{11}H_{12}O_2N_2$ (percent): C, 64.69; H, 5.92; N, 13.72. Found (percent): C, 64.90; H, 5.84; N, 13.78.

Part B: Preparation of 2,3-dihydro-2,3-dimethyl-7-methoxy-4-(1H)-quinazolinone (11)

The method described in Example V, part A, was employed. From the reaction of 8.3 g. (41 mmoles) of (10), 3.78 g. (10 mmoles) of sodium borohydride, and 3.6 g. (60 mmoles) of acetic acid in 40 ml. of dry tetrahydrofuran there was obtained 7.1 g. (86% yield) of (11) as white crystals, M.P. 170–72°. Recrystallization from benzene afforded an analytical sample, M.P. 171–73°.

*Analysis.*—Calcd. for $C_{11}H_{14}O_2N_2$ (percent): C, 64.06; H, 6.84; N, 13.58. Found (percent): C, 64.08; H, 6.93; N, 13.74.

Part C: Preparation of 3,4-dihydro-2,3-dimethyl-7-methoxy-4-oxo-1(2H) - quinazolinecarboxylic acid, ethyl ester (12)

A mixture of 4.12 g. (20 mmoles) of (11), 0.72 g. (30 mmoles; 1.44 g. of 50% mineral oil dispersion washed with hexane) of sodium hydride, and 75 ml. of dry diethyl carbonate was stirred at room temperature for 3 days. The tan suspension was poured onto water and extracted with chloroform. The combined extracts were dried over sodium sulfate and evaporated under reduced pressure to give a yellow oil which was chromatographed on a silica gel column with 1:1 ethyl acetate:hexane to give a clear oil which crystallized upon standing. Recrystallization from hexane gave 3.09 g. (50% yield) of (12) as white crystals, m.p. 72–76°.

*Analysis.*—Calcd. for $C_{14}H_{18}O_4N_1$ (percent): C, 60.42; H, 6.52; N, 10.07. Found (percent): C, 60.45; H, 6.69; N, 10.03.

EXAMPLE VIII

Part A: Preparation of 2,3-dihydro-6,7-dimethoxy-2,2,3-trimethyl-(1H)-quinazolinone (13)

A mixture of 7.35 g. (0.035 mole) of 2-amino-4,5-dimethoxy-NN-methylbenzamide, 350 mg. of p-toluenesulfonic acid, and 90 ml. of acetone was boiled under reflux for 16 hours, cooled, filtered, and concentrated under reduced pressure to give 9.0 g. of an oily solid. Recrystallization of this material from benzene/cyclohexane gave 5.85 g. (67% yield) of (13) as white needles, M.P. 136–37°.

*Analysis.*—Calcd. for $C_{13}H_{18}N_2O_3$ (percent): C, 62.38; H, 7.25; N, 11.19. Found (percent): C, 62.13; H, 7.30; N, 11.24.

Part B: Preparation of 3,4-dihydro-6,7-dimethoxy,2,2,3-trimethyl - 4 - oxo - 1(2H) - quinazolinecarboxylic acid, ethyl ester (14)

To a solution of 3.0 g. (0.012 mole of (13) in 155 ml. of pyridine was added 35 ml. of ethyl chloroformate over 1.25 hrs. at room temperature. The reaction mixture was stirred at room temperature and additional ethyl chloroformate was added after 0.5 hr. (25 ml. and 24 hr. (10 ml.). One hour after the last portion was added, the reaction mixture was evaporated to dryness and the resulting gum was partitioned between 250 ml. of water and 250 ml. of methylene chloride. The aqueous layer was extracted with a second portion of methylene chloride and the combined organic extracts were washed with water, dried over anhydrous sodium sulfate and concentrated under reduced pressure to give a viscous oil. This material was chromatographed with acetonitrile on a silica gel column to give, after recrystallization from benzene/hexane, 530 mg. of (14) as white crystals, M.P. 111–13°.

*Analysis.*—Calcd. for $C_{16}H_{22}O_5N_2$ (percent): C, 59.61; H, 6.88; N, 8.69. Found (percent): C, 59.72; H, 6.89; N, 8.56.

EXAMPLE IX

Part A: Preparation of 2,6,7-trimethyl-4H-3,1-benzoxazin-4-one (15)

A mixture of 10.0 g. (61 mmoles) of 4,5-dimethylanthranilic acid, 40 ml. of acetic anhydride and 40 ml. of benzene was refluxed for 40 min. Removal of the benzene under reduced pressure gave a precipitate which was removed by filtration and washed with hexane/ethanol (10:1) to give 9.0 g. (79% yield) of an amber solid (15), M.P. 151–152°. A small portion was recrystallized from ethanol to give amber crystals, M.P. 150–51°.

*Analysis.*—Calcd. for $C_{11}H_{11}NO_2$ (percent): C, 69.82; H, 5.86; N, 7.40. Found (percent): C, 69.70; H, 5.92; N, 7.39.

Part B: Preparation of 3-propyl-2,6,7-trimethyl-4(3H)-quinazolinone (16)

A mixture of 10 g. (53 mmoles) of (15) and 40 ml. of 40% n-propylamine solution was stirred for 15 min. at room temperature to give a dark solution. Potassium hydroxide (300 mg., 5.3 mmoles) and 20 ml. of ethanol was added and the solution was refluxed for 1 hr., cooled, and the resulting suspension was filtered to give 11.2 g. (92% yield) of (16), M.P. 96–98°. A small portion was recrystallized from isopropyl ether to give an analytical sample, M.P. 96–97°.

*Analysis.*—Calcd. for $C_{14}H_{18}N_2O$ (percent): C, 73.01; H, 7.88; N, 12.17. Found (percent): C, 73.18; H, 7.88; N, 12.16.

Part C: Preparation of 2,3-dihydro-3-propyl-2,6,7-trimethyl-4(1H)-quinazoline (17)

A mixture of 8.0 g. (35 mmoles) of (16), 6.1 g. (160 mmoles) of sodium borohydride, and 90 ml. of dry tetrahydrofuran was heated under reflux while 3 ml. (3.07 g., 52 mmoles) of acetic acid was carefully added dropwise over 2 hrs. The reaction mixture was cooled, poured onto water and extracted with ethyl acetate. The combined extracts were washed with water and saturated sodium chloride solution, dried over magnesium sulfate, and concentrated under reduced pressure to give 7.87 g. (98% yield) of (17) as white crystals, M.P. 124–26.5°. Recrystallization from isopropyl ether afforded an analytical sample, M.P. 125.5–26.5°.

*Analysis.*—Calcd. for $C_{14}H_{20}ON_2$ (percent): C, 72.38; H, 8.68; N, 12.06. Found (percent): C, 72.41; H, 8.60; N, 12.49.

11

Part D: Preparation of 3,4-dihydro-3-propyl-2,6,7-trimethyl-4-oxo-1(2H)-quinazolinecarboxylic acid, ethyl ester (18)

A mixture of 5.0 g. (21 mmoles) of (17), 1.5 g. (27 mmoles) of powdered potassium hydroxide, 10.0 g. (92 mmoles) of ethyl chloroformate, and 150 ml. of acetone was vigorously stirred at room temperature for 24 hours. Additional 1.5 g. portions of potassium hydroxide were added at 1 and 1.5 hours and 5 g. portions of ethyl chloroformate were added at 2 and 23 hrs. The mixture was filtered, evaporated to near dryness under reduced pressure and triturated with isopropyl ether to give 2.53 g. (39% yield) of (18), M.P. 96–98°. Recrystallization from petroleum ether gave a white solid, M.P. 96–98°.

*Analysis.*—Calcd. for $C_{17}H_{24}N_2O_3$ (percent): C, 67.08; H, 7.95; N, 9.20. Found (percent): C, 67.00; H, 7.91; N, 9.13.

EXAMPLE X

Part A: Preparation of 6-bromo-7-chloro-2,3-dimethyl-4(3H)-quinazolinone (19)

A solution of 5.0 g. (19 mmoles) of methyl 5-bromo-4-chloroanthranilate hydrochloride in 24 ml. of dry dimethylacetamide was cooled at 0–10° while 5.6 ml. (9.35 g., 61 mmoles) of phosphorus oxychloride was added dropwise over 15 min. The resulting slurry was stirred 1 hr. at 0–5°, then cautiously quenched by the dropwise addition of 40 ml. of 40% methylamine solution to give a solution which was refluxed 4 hrs., cooled and poured onto 100 ml. of water. The resulting suspension was filtered and washed with water to afford 5.90 g. of (19) as an amber solid. Recrystallization of this material from acetonitrile gave 2.85 g. of (19) as white needles, M.P. 255–56°.

*Analysis.*—Calcd. for $C_{10}H_{18}BrClN_2O$ (percent): C, 42.00; H. 2.80; N, 9.74. Found (percent): C, 41.94; H, 2.87; N, 9.56.

Part B: Preparation of 6-bromo-7-chloro-2,3-dihydro-2,3-dimethyl-4(1H)-quinazolinone (20)

To a mixture of 2.57 g. (8.93 mmoles) of (19), 1.90 g. (50 mmoles) of sodium borohydride, and 90 ml. of dry tetrahydrofuran at gentle reflux was added dropwise approximately 3 ml. of acetic acid over a 2 hr. period. The mixture was cooled, poured onto ice-water, slurried, and filtered to give an amber solid which was taken up in acetone and dried over sodium sulfate. The filtered solution was concentrated to a small volume and cooled to yield 1.93 g. of an amber solid, M.P. 212.5–213.5. A portion of this material was recrystallized from ethanol to give an analytical sample, M.P. 216–17°.

*Analysis.*—Calcd. for $C_{10}H_{10}BrClN_2O$ (percent): C, 41.50; H, 3.46; N, 9.71. Found (percent): C, 41.66; H, 3.37; N, 9.66.

Part C: Preparation of 6-bromo-7-chloro-3,4-dihyhdro-2,3-dimethyl-4-oxo-1(2H)-quinazolinecarboxylic acid, ethyl ester (21)

A suspension of 1.9 g. (6.5 mmoles) of (20), 404 mg. (7.2 mmoles) of powdered potassium hydroxide, 1.05 g. (9.7 mmoles) of ethyl chloroformate, and 30 ml. of dry acetone was stirred 19 hrs. at room temperature under nitrogen. An additional 300 mg. of potassium hydroxide and 250 mg. of ethyl chloroformate was added and the reaction mixture was stirred for an additional 15 min. The reaction mixture was filtered and evaporated under reduced pressure to give a solid which was triturated with ether/hexane to afford (21), M.P. 116–17°. Recrystallization from ether afforded an analytical sample, M.P. 116–17°.

*Analysis.*—Calcd. for $C_{13}H_{14}BrClO_3N_2$ (percent): C, 43.17; H, 3.90; N, 7.75. Found (percent): C, 43,40; H, 3.93; N, 7.65.

EXAMPLE XI

Part A: Preparation of 2,3-dimethyl-6-hydroxy-7-methoxy-4(3H)-quinazolinone (22)

Method A.—A mixture of 29.5 g. (125 mmoles) of 6,7-dimethoxy-2,3-dimethyl-4(3H)-quinazolinone (Example 2) and 500 ml. of 48% hydrobromic acid was refluxed for 2 hrs. The resulting white suspension was cooled, filtered, and dried under reduced pressure to give 29.0 g. (80% yield) of the hydrobromide salt of (22), M.P. 285–286°.

*Analysis.*—Calcd. for $C_{11}H_{12}N_2O_3 \cdot HBr$ (percent): C, 43.89; H, 4.02; N, 9.31. Found (percent): C, 43.11; H, 4.29; N, 9.40.

The free base (22) is liberated by dissolution in water and treatment with ammonium hydroxide solution.

Method B.—A solution of 8.8 g. (44.5 mmoles) of methyl 5-hydroxy-4-methoxyanthranilate in 40 ml. of dry dimethylacetamide was cooled at 0–5° under nitrogen while 8.9 g. (58 mmoles) of phosphorous oxychloride was added dropwise over 30 min. The resulting white slurry was stirred for 2 hrs. at 0–5° and then quenched by the careful addition of 100 ml. of 40% methylamine solution while the temperature was maintained below 60°. The resulting pale red solution was heated at 50–60° for 2 hours, cooled and made slightly acid by the addition of 6 N hydrochloric acid. The resulting white solid was filtered and dried to give 5.61 g. (58% yield) of (22), M.P. 259–262°. Recrystallization from methanol gave an analytical sample, M.P. 263–64°.

*Analysis.*—Calcd. for $C_{11}H_{12}N_2O_3$ (percent); C, 59.99; H, 5.49; N, 12.72. Found (percent): C, 59.92; H, 5.52; N, 12.80.

Part B: Preparation of 2,3-dimethyl-6-ethoxy-7-methoxy-4(3H)-quinazolinone (23)

To a solution of 9.9 g. (45 mmoles) of (22) in 450 ml. of dry dimethylformamide was added 10 g. (64 mmoles) of ethyl iodide and 6.2 g. (45 mmoles) of anhydrous potassium carbonate. The reaction mixture was stirred 20 hours at room temperature, then poured onto 1800 ml. of water and extracted with methylene chloride (5× 300 ml.). The combined extracts were washed with 3% aqueous sodium hydroxide and water, dried over magnesium sulfate, and concentrated under reduced pressure to give a pale yellow solid which was recrystallized from benzene/hexane to yield 8.1 g. (73% yield) of (23) as white needles, M.P. 171–73.5°.

*Analysis.*—Calcd. for $C_{13}H_{16}O_3N_2$ (percent): C, 62.89; H, 6.50; N, 11.28. Found (percent): C, 62.65; H, 6.53; N, 11.10.

Part C: Preparation of 2,3-dihydro-2,3-dimethyl-6-ethoxy-7-methoxy-4(1H)-quinazolidone (24)

The method described previously in Example V, part A was employed. From the reaction of 6.5 g. (26 mmoles) of (23), 3.0 g. (79 mmoles) of sodium borohydride, 3 ml. (52 mmoles) of acetic acid, and 10 ml. of tetrahydrofuran was obtained 6.39 g. (97% yield) of a white solid (24), M.P. 140–42°. Recrystallization from benzene/hexane gave an analytical sample, M.P. 141–42°.

*Analysis.*—Calcd. for $C_{13}H_{18}O_3N_2$ (percent): C, 62.38; H, 7.25; N, 11.19. Found (percent): C, 62.52; H, 7.22; N, 11.04.

Part D: Preparation of 3,4-dihydro-2,3-dimethyl-6-ethoxy-7-methoxy-4-oxo-1(2H)quinazolinecarboxylic acid, ethyl ester (25)

The method described in Example V, part B, was employed; to initiate the reaction, it was necessary to briefly heat the reaction to reflux. From the reaction of 2.48 g. (10 mmoles) of (24), 0.53 g. (22 mmoles) of sodium hydride, and 25 ml. of diethyl carbonate was obtained after recrystallization from benzene/hexane 1.09 g. (34% yield) of (26) as white crystals, M.P. 102–105°.

*Analysis.*—Calcd. for $C_{16}H_{22}O_5N_2$ (percent): C, 59.61; H, 6.88; N, 8.69. Found (percent): C, 59.48; H, 6.86; N, 8.46.

EXAMPLE XII

Part A: Preparation of 7-ethoxy-3-ethyl-6-methoxy-2-methyl-4(3H)-quinazolinone (26)

To a mechanically stirred slurry of 25.0 g. (0.11 mole) of methyl 4-ethoxy-5-methoxyanthranilate in 92 ml. of dry dimethylacetamide at 0–5° was added 34 g. (0.22 mole) of phosphorus oxychloride over 30 min. The resulting slurry was stirred for 2 hours at 0–10°, and was then cautiously treated dropwise with 280 ml. of 40% ethylamine solution while the temperature was maintained at 90–100°. Upon cooling, a white precipitate formed which was filtered and dried to give 24.6 g. (85% yield) of (26), M.P. 183–85°.

Part B: Preparation of 2,3-dihydro-7-ethoxy-3-ethyl-6-methoxy-2-methyl-4(1H)-quinazolinone (27)

The method described in Example V, part A, was employed. From the reaction of 13.3 g. (50 mmoles) of (26), 4.4 g. (126 mmoles) of sodium borohydride, and 4.3 g. (73 mmoles) of acetic acid in 210 ml. of tetrahydrofuran was obtained 13.4 g. (100% yield) of a white solid (27), M.P. 111–13°.

Part C: Preparation of 3,4-dihydro-7-ethoxy-3-ethyl-6-methoxy-2-methyl-4-oxo-1(2H) - quinazolinecarboxylic acid, ethyl ester (28)

A solution of 14.0 g. (53 mmoles) of (27) and 6.3 g. of dry pyridine (80 mmoles) in 250 ml. of dichloromethane was stirred at room temperature while 8.6 g. (80 mmoles) of ethyl chloroformate was added dropwise over 30 minutes. The reaction mixture washed with water, 2% hydrochloric acid solution, and saturated sodium chloride solution, dried over magnesium sulfate and concentrated under reduced pressure to give 18.5 g. of a yellow oil which was chromatographed on a silica gel column (chloroform). There was obtained 12.2 g. (68% yield) of (28), M.P. 84–86°.

*Analysis.*—Calcd. for $C_{17}H_{24}O_5N_2$ (percent): C, 60.77; H, 7.20; N, 8.34. Found (percent): C, 60.84; H, 7.16; N, 8.27.

EXAMPLE XIII

Part A: Preparation of 2,3-dimethyl-7-isopropoxy-6-methoxy-4(3H)-quinazolinone (29)

The method described in Example XII, part A, was employed. From the reaction of 16.0 g. (70 mmoles) of methyl 4-isopropoxy-5-methoxy-anthranilate, 21.5 g. (140 mmoles) of phosphorus oxychloride, and 65 ml. of dimethylacetamide, followed by treatment with 134 ml. of 40% methylamine solution, there was obtained 13.1 g. of white needles (29). M.P. 146–48°.

*Analysis.*—Calcd. for $C_{14}H_{18}O_3N_2$ (percent): C, 64.18; H, 6.91; N, 10.69. Found (percent): C, 63.63; H, 6.94; N, 10.56.

Part B. Preparation of 2,3-dihydro-2,3-dimethyl-7-isopropoxy-6-methoxy-4(1H)-quinazolinone (30)

The method described in Example XII, part B, was employed. From the reaction of 10.7 g. (41 mmoles) of (29), 3.8 g. (102 mmoles) of sodium borohydride, and 3.06 g. (51 mmoles) of acetic acid in 200 ml. of dry tetrahydrofuran there was obtained 10.8 g. (100% yield) of (30) as a yellowish oil.

Part C: Preparation of 3,4-dihydro-2,3-dimethyl-7-isopropoxy - 6 - methoxy - 4 - oxo - 1(2H) - quinazolinecarboxylic acid, ethyl ester (31)

The method described in Example XII, part C, was used. From the reaction of 7.8 g. (30 mmoles) of (30), 3.99 g. (44 mmoles) of dry pyridine, and 4.73 g. (44 mmoles) of ethyl chloroformate in 250 ml. of methylene chloride there was obtained an oil (14.3 g.) which was chromatographed on silica gel with chloroform to give 6.8 g. of a white solid (31), M.P. 80–82°.

*Analysis.*—Calcd. for $C_{17}H_{24}O_5N_2$ (percent): C, 60.77; H, 7.20; N, 8.34. Found (percent): C, 60.62; H, 7.14; N, 8.23.

EXAMPLE XIV

Part A: Preparation of 3,4-dihydro-6,7-dimethoxy-2,3-dimethyl-4-oxo-1(2H)-quinazolinecarboxylic acid, methyl ester (32)

The method described in Example V, part B, was employed with the exception that dimethyl carbonate was substituted for diethyl carbonate. From the reaction of 5.0 g. of Compound 3 (Example IV), 1.44 g. of a 49% dispersion of sodium hydride in mineral oil, and 60 ml. of dimethyl carbonate there was obtained a brown oil which was chromatographed on silica gel (ethyl acetate) to give 3.25 g. of viscous yellow oil which crystallized upon standing. Recrystallization from isopropyl ether gave Compound 32 as white crystals, M.P. 95–97°.

*Analysis.*—Calcd. for $C_{14}H_{18}O_5N_2$ (percent): C, 57.13; H, 6.17; N, 9.52. Found (percent): C, 57.08; H, 6.19; N, 9.49.

EXAMPLE XV

The following 6,7-disubstituted quinazolinone compounds are prepared according to the procedure described in Examples I to XIV from the appropriate starting compounds:

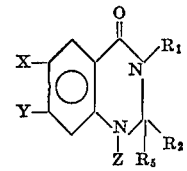

| Compound | X | Y | R₁ | R₂ | R₅ | Z | M.P. (° C.) |
|---|---|---|---|---|---|---|---|
| 1 | H | H | CH₃ | CH₃ | H | C(O)OC₂H₅ | 56–59 |
| 2 | H | NO₂ | CH₃ | CH₃ | H | C(O)OC₂H₅ | 122–24 |
| 3 | H | Cl | CH₃ | CH₃ | H | C(O)OC₂H₅ | 113–15 |
| 4 | CH₃ | H | CH₃ | CH₃ | H | C(O)OC₂H₅ | (¹) |
| 5 | CH₃O | H | CH₃ | CH₃ | H | C(O)OC₂H₅ | (¹) |
| 6 | Cl | H | CH₃ | CH₃ | H | C(O)OC₂H₅ | 78–80 |
| 7 | NO₂ | CH₃O | CH₃ | CH₃ | H | C(O)OC₂H₅ | 127–128 |
| 8 | i-C₃H₇O | CH₃O | CH₃ | CH₃ | H | C(O)OC₂H₅ | 87–89 |
| 9 | C₄H₉O | CH₃O | CH₃ | CH₃ | H | C(O)OC₂H₅ | 99–100 |
| 10 | C₂H₅O | C₂H₅O | CH₃ | CH₃ | H | C(O)OC₂H₅ | 94–95 |
| 11 | C₂H₅O | C₂H₅O | C₂H₅ | n-C₄H₉ | CH₃ | C(O)H | |
| 12 | C₂H₅O | C₂H₅O | n-C₃H₇ | C₂H₅ | n-C₄H₉ | C(O)CF₃ | |
| 13 | Cl | | i-C₄H₉ | CH₃ | H | C(O)OC₂H₅ | 71–73 |
| 14 | i-C₃H₇O | i-C₃H₇O | CH₃ | CH₃ | CH₃ | C(O)OC₂H₅ | (¹) |
| 15 | i-C₃H₇O | i-C₃H₇O | C₂H₅ | CH₃ | H | C(O)OC₂H₅ | (¹) |
| 16 | i-C₃H₇O | i-C₃H₇O | n-C₃H₇ | CH₃ | H | C(O)OC₂H₅ | (¹) |
| 17 | —CH=CH— | CH=CH— | CH₃ | CH₃ | H | C(O)OC₂H₅ | 123–26 |
| 18 | n-C₄H₉O | n-C₄H₉O | CH₃ | CH₃ | H | C(O)OC₂H₅ | (¹) |
| 19 | n-C₄H₉O | n-C₄H₉O | C₂H₅ | H | C₂H₅ | C(O)CH₃ | |
| 20 | n-C₄H₉O | n-C₄H₉O | n-C₃H₇ | CH₃ | H | C(O)OC₂H₅ | (¹) |

See footnotes at end of table.

TABLE—Continued

| Compound | X | Y | $R_1$ | $R_2$ | $R_3$ | Z | M.P. (° C.) |
|---|---|---|---|---|---|---|---|
| 21 | Cl | Cl | $CH_3$ | $CH_3$ | H | $C(O)OC_2H_5$ | 118–19.5 |
| 22 | $CH_3O$ | $C_2H_5O$ | $CH_3$ | $CH_3$ | H | $C(O)OC_2H_5$ | (1) |
| 23 | $CH_3O$ | $C_2H_5O$ | $C_2H_5$ | $CH_3$ | H | $C(O)OC_2H_5$ | 84–86 |
| 24 | $CH_3O$ | $C_2H_5O$ | $n-C_3H_7$ | $CH_3$ | H | $C(O)OC_2H_5$ | (1) |
| 25 | $CH_3O$ | $i-C_3H_7O$ | $CH_3$ | $CH_3$ | H | $C(O)OC_2H_5$ | 80–82 |
| 26 | $CH_3O$ | $i-C_3H_7O$ | $C_2H_5$ | $CH_3$ | H | $C(O)OC_2H_5$ | 119–121 |
| 27 | $CH_3O$ | $i-C_3H_7O$ | $n-C_3H_7$ | $CH_3$ | H | $C(O)OC_2H_5$ | 79–80 |
| 28 | $CH_3O$ | $n-C_4H_9O$ | $CH_3$ | $CH_3$ | H | $C(O)OC_2H_5$ | (1) |
| 29 | $CH_3O$ | $n-C_4H_9O$ | $C_2H_5$ | $CH_3$ | H | $C(O)OC_2H_5$ | (1) |
| 30 | $CH_3O$ | $n-C_4H_9O$ | $n-C_3H_7$ | $CH_3$ | H | $C(O)OC_2H_5$ | (1) |
| 31 | $-O-CH_2-O-$ | | $CH_3$ | $CH_3$ | H | $C(O)OC_2H_5$ | 130–131 |
| 32 | $-O-(CH_2)_2O-$ | | $CH_3$ | $CH_3$ | H | $C(O)OC_2H_5$ | 151–155 |
| 33 | Br | $CH_3O$ | $CH_3$ | $CH_3$ | H | $C(O)OC_2H_5$ | 112–113 |
| 34 | $CH_3O$ | Cl | $CH_3$ | H | H | $C(O)OC_2H_5$ | 145.8–146.3 |
| 35 | HO | $CH_3O$ | $CH_3$ | $CH_3$ | H | $C(O)nC_4H_9$ | |
| 36 | $CH_3O$ | HO | $CH_3$ | H | $i-C_3H_7$ | $C(O)NH_2$ | |
| 37 | $NH_2 \cdot HCl$ | $CH_3O$ | $CH_3$ | $CH_3$ | H | $C(O)OC_2H_5$ | ² 140 |
| 38 | $CH_3$ | $CH_3$ | $CH_3$ | $CH_3$ | H | $C(O)OC_2H_5$ | 119.5–20.5 |
| 39 | $CH_3$ | $CH_3$ | $C_2H_5$ | $CH_3$ | H | $C(O)OC_2H_5$ | 134–36 |
| 40 | Cl | $CH_3O$ | $CH_3$ | $CH_3$ | H | $C(O)OC_2H_5$ | 113–114.5 |
| 41 | $n-C_4H_9$ | $C_2H_5$ | H | H | $CH_3$ | CN | |
| 42 | F | F | H | H | $CH_3$ | $C(O)OnC_5H_9$ | |
| 43 | F | F | H | $CH_3$ | $CH_3$ | $C(O)NH(CH_3)$ | |
| 44 | Cl | Cl | H | $CH_3$ | $CH_3$ | $C(O)N(l-C_4H_9)_2$ | |

¹ Oily product.
² Decomposes.

The activity of compounds of the invention as a tranquilizing agent has been shown by their effectiveness in one or more of the following tests: (a) conditioned avoidance behavior and (b) symptomatological effects.

The activity of compounds of the invention as an analgesic agent has been shown by their effectiveness in one or more of the following tests: (c) suppression of writhing; (d) suppression of the "jump" component of the Evans flinch-jump test: and (e) altered escape threshold on the rat escape-titration test.

EXAMPLE XVI I

Tranquilizer activity of Compound 4 in Example III or IV (a) Conditioned avoidance behavior.—A modification of the method of Maffii (J. Pharm. Pharmacol., 11, 129 (1959)) was employed. Compound 4 suppresses conditioned avoidance behavior in the jump-box test in rats at 32 mg./kg. i.p. and above; the oral $ED_{50}$ is about 100 mg./kg. Its intraperitoneal potency is thus about 6 times less than that of chlorpromazine. Its duration of action at equivalent does is slightly shorter. Both orally and intraperitoneally, the selectivity of the avoidance suppressing effect is comparable to that of chlorpromazine; that is, Compound 4 does not exhibit the pronounced selectivity of such drugs as thiothixene.

In Sidman avoidance behavior, Compound 4, at 17.8 mg./kg. i.p. in rats, exerts a disruptive effect for about an hour after treatment.

(b) Symptomatological effects. — Compound 4 is acutely lethal to mice at 1000 mg./kg. i.p. Symptoms preceding mortality include ataxia, loss of righting, and labored respiration. At non-lethal (316 mg./kg. to 32 mg./kg.) behavioral depression, including reduced motor activity and rotorod deficit, are seen. At 10 mg./kg. i.p. mice are asymptomatic.

The i.p. $LD_{50}$ in rats lies between 178 and 316 mg./kg. Symptoms at and below toxic doses are similar to those seen in mice. At 32 mg./kg. motor activity is decreased, but other overt signs are absent.

In dogs, 10 mg./kg. orally produces ataxia and obvious central nervous system (CNS) depression; one of four dogs at this dose in fact went to sleep in a noisy animal room.

Analgesic activity of Compound 4 in Example III or IV (c) Suppression of writhing.—The phenyl-p-benzoquinone (PBQ) writhing experiments were performed according to the method of Sigmund and coworkers (E. Sigmund, R. Cadmus, and G. Lu, Proc. Soc. Exp. Biol., 95, 729 (1957)). In mice, Compound 4, given orally, suppresses writhing (repetitive abdominal contractions) produced by intraperitoneal injections of phenylbenzoquinone (PBQ), acetylcholine and tryptamine. Its oral $ED_{50}$ versus PBQ, is 18.5 mg./kg. which compares with $ED_{50}$'s of .5 and 245 mg./kg., respectively, for morpholine sulfate and aspirin. Its blockade of acetylcholine writhing ($ED_{50}$=31.4 mg./kg. p.o.) is unaccompanied by evidence of anticholinergic activity.

(d) Suppression of the "jump" component of the Evans flinch-jump test.—The Evans flinch-jump experiments were performed according to the method of Evans (W. O. Evans, Psychopharmacologia, 2, 318 (1961)). In rats, Compound 4, at 17.8 mg./kg. and above increases the minimal shock intensity required to elicit a "jump" response. Intensities required to elicit a "flinch" response, or an audible "squeak" are essentially unchanged, even after 56 mg./kg. At 100 mg./kg. i.p., however, even these measures are affected.

(e) Altered escape threshold on the rat escape-titration test.—This procedure is based on a modification of the method of Weiss and Laties (B. Weiss and V. G. Laties, Science, 128, 1575 (1958)). At about 17.8 mg./kg. i.p., Compound 4 causes a rapid rise in shock thresholds required to cause the animal to emit a learned escape response of lever pressing. This sudden rise diminishes over a period of several hours.

EXAMPLE XVII

Tranquilizer activity of compound (2) in Example II (a) Conditioned avoidance behavior.—A modification of the method of Maffii (J. Pharm. Pharmacol, 11, 129 (1959)) was employed. Compound 2 suppresses conditioned avoidance behavior in the jump-box test in rats at 56 mg./kg. i.p. and above. It is inactive at 32 mg./kg. i.p. Its intraperitoneal potency is thus about 10 times less than that of chlorpromazine.

(b) Symptomatological effects.—Compound 2 is acutely lethal to mice at 1000 mg./kg. i.p. At a non-lethal dose (100 mg./kg.) reduced motor activity is seen.

EXAMPLE XVIII

Tranquilizer activity of compound (6) in Example V (b) Symptomatological effects.—Compound 6 is acutely lethal to mice at 316 and 1000 mg./kg. i.p. Symptoms preceding the mortality include ataxia, convulsions, and tremors. At the non-lethal dose of 100 mg./kg. behavioral depression, including reduced motor activity and rotorod deficit, are seen. At 32 mg./kg. i.p. mice are asymptomatic.

Analgesic activity of compound (6) in Example V (c) Suppression of writhing.—The phenyl-p-benzoquinone (PBQ) writhing experiments were performed according to the method of Sigmund and coworkers (E. Sigmund, R. Cadmus, and G. Lu, Proc. Soc. Exp. Biol., 95, 729 (1957)). In mice, Compound 6, given orally at a dose of 100 mg./kg., suppresses writhing (repetitive abdominal contractions) produced by intraperitoneal injections of phenylbenzoquinone (PBQ).

(e) Altered escape threshold on the rate escape-titration test.—This procedure is based on a modification of the method of Weiss and Laties (B. Weiss and V. G. Laties, Science, 128, 1575 (1958)). At about 17.8 mg./kg. i.p., Compound 6 causes a rapid rise in shock thresholds required to cause the animal to emit a learned escape response of lever pressing. This sudden rise diminishes over a period of several hours.

EXAMPLE XIX

Tranquilizer activity of compound (9) in Example VI (a) Conditioned avoidance behavior.—Compound 9 suppresses conditioned avoidance behavior in the jump-box test in rats at 32 mg./kg. i.p.

(b) Symptomatological and toxic effects.—Compound 9 is acutely lethal to mice at 320 mg./kg. i.p. Symptoms preceding mortality include convulsions. At non-lethal doses (32 mg./kg. to 100 mg./kg.) behavioral depression, including reduced motor activity and rotorod deficit, are seen. At 32 mg./kg. i.p. mice are asymptomatic.

Analgesic activity of compound (9) in Example VI (c) Suppression of writhing.—In mice, Compound 9, given orally, (100 mg./kg.) suppresses writhing (repetitive abdominal contractions) produced by intraperitoneal injections of phenylbenzoquinone (PBQ).

(d) Suppression of the "jump" component of the Evans flinch-jump test.—In rats, Compound 9, at 32 mg./kg. and above increases the minimal shock intensity required to elicit a "jump" response. Intensities required to elicit a "flinch" response, or an audible "squeak" are essentially unchanged.

(e) Altered escape threshold on the rat escape-titration test.—At about 32 mg./kg. p.o., Compound 9 causes a rapid rise in shock thresholds required to cause the animal to emit a learned escape response of lever pressing. This sudden rise continues for over 100 minutes.

EXAMPLE XX

Tranquilizer activity of compound (12) in Example VII (a) Conditioned avoidance behavior.—Compound 12 suppresses conditioned avoidance behavior in the jump-box test in rats at 56 mg./kg. i.p. and above.

(b) Symptomatological and toxic effects.—Compound 12 is actually lethal to mice at 1000 mg./kg. i.p. Symptoms preceding mortality include ataxia. At non-lethal doses (100 mg./kg. to 316 mg./kg.) behavioral depression, including reduced motor activity and rotorod deficit, are seen. At 100 mg./kg. i.p. mice are asymptomatic.

Analgesic activity of compound (12) in Example VII (d) Suppression of the "jump" component of the Evans flinch-jump test.—In rats, Compound 12, at 32 mg./kg. and above increases the minimal shock intensity required to elicit a "jump" response. Intensities required to elicit a "flinch" response, or an audible "squeak" are essentially unchanged.

EXAMPLE XXI

Tranquilizer activity of compound (14) in Example VIII (b) Symptomatological and toxic effects.—Compound 14 is acutely lethal to mice at 1000 mg./kg. i.p. Symptoms preceding mortality include tremors and loss of righting. At non-lethal doses (100 mg./kg. to 320 mg./kg.) be-behavioral depression, including reduced motor activity and rotorod deficit, are seen. At 32 mg./kg. i.p. mice are asymptomatic.

Analgesic activity of compound (14) in Example VIII (c) Suppression of writhing.—In mice, Compound 14, given orally, (100 mg./kg.), suppresses writhing (repetitive abdominal contractions) produced by intraperitoneal injections of phenylbenzoquinone (PBQ).

(d) Suppression of the "jump" component of the Evans flinch-jump test.—In rats, Compound 14 at 32 mg./kg. and above increases the minimal shock intensity required to elicit a "jump" response. Intensities required to elicit a "flinch" response, or an audible "squeak" are essentially unchanged, even after 32 mg./kg.

EXAMPLE XXIII

Tranquilizer activity of compound (18) in Example IX (a) Conditioned avoidance behavior.—Compound 18 has no effect on conditioned avoidance behavior in the jump-box test in rats at 56 mg./kg. i.p.

(b) Symptomatological and toxic effects.—Compound 18 is actually lethal to mice at 100 mg./kg. i.p. Symptoms preceding mortality include ataxia, loss of righting, clonic convulsions and labored respiration. At non-lethal doses (100 mg./kg. to 316 mg./kg.) behavioral depression, including reduced motor activity and rotorod deficit, tremors, and convulsions are seen. At 3.2 mg./kg. i.p. mice are asymptomatic.

Analgesic activity of compound (18) in Example IX (c) Suppression of writhing.—In mice, Compound 18, given orally, (100 mg./kg.), suppresses writhing (repetitive abdominal contractions) produced by intraperitoneal injections of phenylbenzoquinone (PBQ).

(d) Suppression of the "jump" component of the Evans flinch-jump test.—In rats, Compound 18, at 32 mg./kg. slightly increases the minimal shock intensity required to elicit a "jump" response. Intensities required to elicit a "flinch" response, or an audible "squeak" are essentially unchanged.

EXAMPLE XXIII

Tranquilizer activity of compound (21) in Example X (a) Conditioned avoidance behavior.—Compound 21 does not suppress conditioned avoidance behavior in the jump-box test in rats at 56 mg./kg. i.p.

(b) Symptomatological and toxic effects.—Compound 21 is acutely lethal to mice at 1000 mg./kg. i.p. Symptoms preceding mortality include ataxia, loss of righting, decreased body temperature, tremors, convulsions and labored respiration. At non-lethal doses (100 mg./kg. to 316 mg./kg.) behavioral depression, including reduced motor activity and rotorod deficit, are seen. At 10 mg./kg. i.p. mice are asymptomatic.

Analgesic activity of compound (21) in Example X (c) Suppression of writhing.—In mice, Compound 21, given orally (100 mg./kg.) partially suppresses writhing (repetitive abdominal contractions) produced by intraperitoneal injections of phenylbenzoquinone (PBQ).

(d) Suppression of the "jump" component of the Evans flinch-jump test.—In rats, Compound 21, at 32 mg./kg. slightly increases the minimal shock intensity required to elicit a "jump" response. Intensities required to elicit a "flinch" response, or an audible "squeak" are essentially unchanged.

EXAMPLE XXIV

Tranquilizer activity of compound (25) in Example XI (a) Conditioned avoidance behavior.—Compound 25 suppresses conditioned avoidance behavior in the jump-box test in rats at 32 mg./kg. i.p.

(b) Symptomatological and toxic effects.—Compound 25 is acutely lethal to mice at 316–1000 mg./kg. i.p. Symptoms preceding mortality include ataxia, loss of righting, salivation, tremors, clonic convulsions and labored respiration. At non-lethal doses (32 mg./kg. to 100 mg./kg.)

behavioral depression, including reduced motor activity and rotorod deficit, are seen. At 10 mg./kg. i.p. mice are asymptomatic.

Analgesic activity of compound (25) in Example XI (c) Suppression of writhing.—In mice, Compound 25, given orally (100 mg./kg.), partially suppresses writhing (repetitive abdominal contractions) produced by intraperitoneal injections of phenylbenzoquinone (PBQ).

(d) Suppression of the "jump" component of the Evans flinch-jump test.—In rats, Compound 25 at 32 mg./kg. and above increases the minimal shock intensity required to elicit a "jump" response. Intensities required to elicit a "flinch" response, or an audible "squeak" are essentially unchanged.

EXAMPLE XXV

Tranquilizer activity of compound (28) in Example XII (a) Conditioned avoidance behavior.—Compound 28 suppresses conditioned avoidance behavior in the jump-box test in rats at 32 mg./kg. i.p.

(b) Symptomatological and toxic effects.—Compound 28 is acutely lethal to mice at 316–1000 mg./kg. p.o. Symptoms preceding mortality include ataxia, loss of righting, clonic convulsions and labored respiration. At non-lethal doses (32 mg./kg. to 100 mg./kg.) behavioral depression, including reduced motor activity and rotorod deficit, flushing, and miosis are seen. At 3.2 mg./kg. i.p. mice are asymptomatic.

Analgesic activity of compound (28) in Example XII (c) Suppression of writhing.—In mice, Compound 28, given orally (100 mg./kg.), suppresses writhing (repetitive abdominal contractions) produced by intraperitoneal injections of phenylbenzoquinone (PBQ).

(d) Suppression of the "jump" component of the Evans flinch-jump test.—In rats, Compound 28, at 32 mg./kg. increases the minimal shock intensity required to elicit a "jump" response. Intensities required to elicit a "flinch" response, or an audible "squeak" are essentially unchanged.

(e) Altered escape threshold on the rat escape-titration test.—At about 32 mg./kg. p.o., Compound 28 causes a slight rise in shock thresholds required to cause the animal to emit a learned escape response of lever pressing.

EXAMPLE XXVI

Tranquilizer activity of compound (31) in Example XIII (b) Symptomatological and toxic effects.—Compound 31 is acutely lethal to mice at 316–1000 mg./kg. i.p. Symptoms preceding mortality include ataxia, loss of righting, tremors, clonic convulsions and labored respiration. At non-lethal doses (32 mg./kg. to 100 mg./kg.) behavioral depression, including reduced motor activity and rotorod deficit, increased salivation and lacrimation are seen. At 3.2 mg./kg. i.p. mice are asymptomatic.

Analgesic activity of compound (31) in Example XIII (c) Suppression of writhing.—In mice, Compound 31, given orally (100 mg./kg.), partially suppresses writhing (repetitive abdominal contractions) produced by intraperitoneal injections of phenylbenzoquinone (PBQ).

(d) Suppression of the "jump" component of the Evans flinch-jump test.—In rats, Compound 31, at 32 mg./kg. increases the minimal shock intensity required to elicit a "jump" response. Intensities required to elicit a "flinch" response, or an audible "squeak" are essentially unchanged.

(e) Altered escape threshold on the rat escape-titration test.—At about 32 mg./kg. p.o., Compound 31 does not cause a rapid rise in shock thresholds required to cause the animal to emit a learned escape response of lever pressing.

What is claimed is:

1. A compound selected from the group consisting of those having the formula:

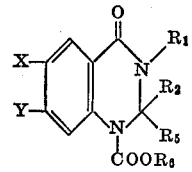

wherein:

X and Y are each —OR;

R, $R_1$, $R_2$, and $R_5$ are each selected from the group consisting of hydrogen and lower alkyl, said lower alkyl having from 1 to 4 carbon atoms; and $R_6$ is lower alkyl, said lower alkyl having 1 to 4 carbon atoms.

2. 3,4 - dihydro - 6,7 - dimethoxy - 2,3 - dimethyl-4-oxo-1(2H)-quinazolinecarboxylic acid, ethyl ester.

3. 3,4 - dihydro - 6,7 - dimethoxy - 3 - methyl-4-oxo-1(2H)-quinazolinecarboxylic acid, ethyl ester.

4. 3,4 - dihydro - 6,7 - dimethoxy - 3 - ethyl-2-methyl-4-oxo-1(2H)-quinazolinecarboxylic acid, ethyl ester.

5. 3,4 - dihydro - 6,7 - dimethoxy - 2-methyl-3-propyl-4-oxo-1(2H)-quinazolinecarboxylic acid, ethyl ester.

6. Claim compound 3,4 - dihydro-6,7-dimethoxy-2,2,3-trimethyl-4-oxo-1(2H)-quinazolinecarboxylic acid, ethyl ester.

7. Claim compound 3,4 - dihydro - 2,3 - dimethyl-6-ethoxy - 7 - methoxy-4-oxo-1(2H)-quinazolinecarboxylic acid, ethyl ester.

8. Claim compound 3,4 - dihydro - 7 - ethoxy-3-ethyl-6 - methoxy - 2 - methyl-4-oxo-1(2H)-quinazolinecarboxylic acid, ethyl ester.

9. Claim compound 3,4 - dihydro-2,3-dimethyl-7-isopropoxy - 6-methoxy-4-oxo-1(2H)-quinazolinecarboxylic acid, ethyl ester.

10. 3,4 - dihydro - 2,3 - dimethyl-7-methoxy-4-oxo-1(2H)-quinazolinecarboxylic acid, ethyl ester.

References Cited

UNITED STATES PATENTS 3,092,631  1/1963  Song et al. _____ 260—251
3,714,354  1/1973  Stam _____ 424—251

ALEX MAZEL, Primary Examiner

R. V. RUSH, Assistant Examiner

U.S. Cl. X.R.

424—251